(No Model.)
F. GUSTAVESON.
AIR VALVE.
No. 544,167.  Patented Aug. 6, 1895.
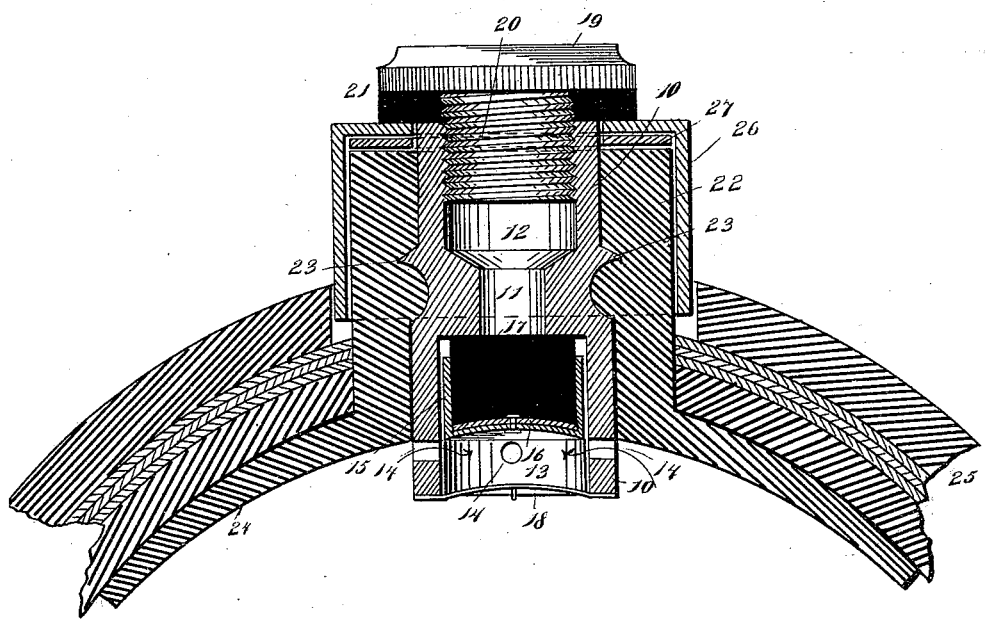
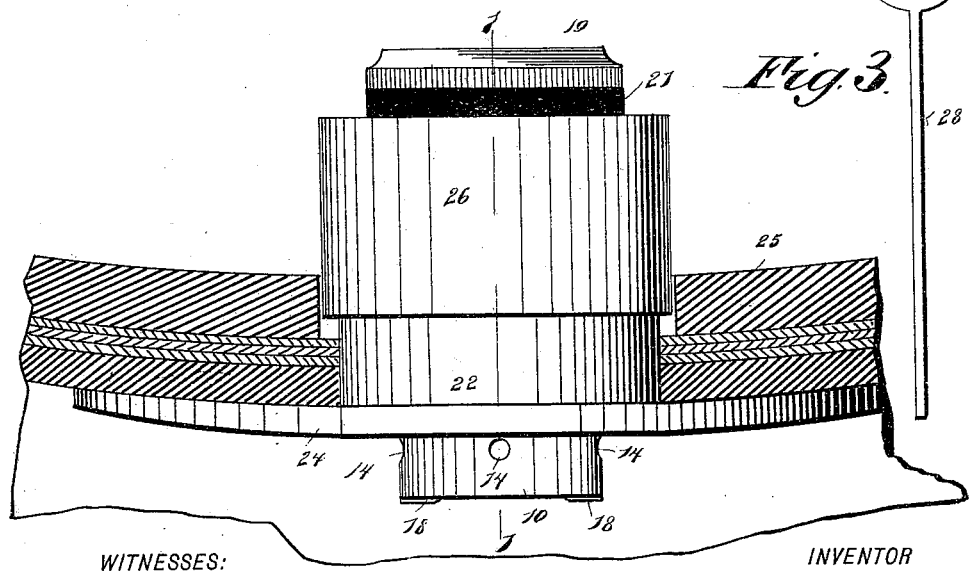
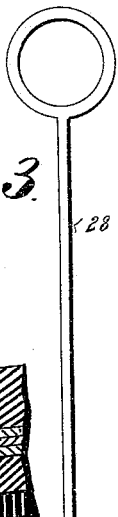
WITNESSES:
F. McArdle.
W. P. Hutchinson.
INVENTOR
F. Gustaveson
BY Munn & Co.
ATTORNEYS.

UNITED STATES PATENT OFFICE.

FRANK GUSTAVESON, OF WABASHA, MINNESOTA.

AIR-VALVE.

SPECIFICATION forming part of Letters Patent No. 544,167, dated August 6, 1895.

Application filed September 4, 1894. Serial No. 522,122. (No model.)

*To all whom it may concern:*

Be it known that I, FRANK GUSTAVESON, of Wabasha, in the county of Wabasha and State of Minnesota, have invented a new and Improved Air-Valve, of which the following is a full, clear, and exact description.

My invention relates to improvements in air-valves, and particularly to such valves as are used in connection with pneumatic tires to permit the inflation of the tires and to prevent the accidental deflation thereof. Such valves as usually made protrude from the rim to an objectionable extent, and, moreover, the valves are usually made in several parts and more or less complicated and are likely to leak.

The object of my invention is to remedy these defects and produce a valve of the greatest simplicity and cheapness, which when applied to a tire and wheel-rim will protrude but very little from the rim, which may be very easily secured in place on the tire, which is perfectly air-tight, is dust-proof, and is of such construction that it is not liable to get out of order.

To these ends my invention consists of certain features of construction and combinations of parts, which will be hereinafter described and claimed.

Reference is to be had to the accompanying drawings, forming a part of this specification, in which similar figures of reference indicate corresponding parts in all the views.

Figure 1 is a cross-section on the line 1 1 of Fig. 2, showing my improved valve as applied to a bicycle-tire. Fig. 2 is a side elevation of the valve as applied to the tire, the latter being shown in section; and Fig. 3 is a detail view of the key which is used in deflating the tire.

The valve is provided with a generally cylindrical casing 10, which is on its inner side and near the center preferably contracted, as shown at 11, to form a central passage connecting the outer and inner chambers 12 and 13, the latter of which is adapted to open into the tire and is provided with side ports 14 to facilitate the flow of air through the valve. In this inner chamber 13 is a valve comprising a shell 15, which is open at one end, a washer 16, riveted or otherwise held in the closed end of the shell, and a block 17, of rubber or other suitable material, which fits snugly in the shell, projects slightly from the end thereof, and is adapted to seat itself over the passage 11, so that when held in this position it prevents the escape of air.

Across the inner end of the chamber 13 are wires 18 which prevent the valve from falling out of the said chamber. The valve is loose in the chamber 13, so that when air is forced into the valve-casing and through the passage 11 the valve will be pushed from its seat and the air will pass inward around the sides of the valve to the interior of the tire. When, however, the inflowing-pressure is removed the back-pressure pushes the valve against its seat and makes an air-tight closure.

The outer end of the casing 10 is closed by a plug having a head 19 and a screw 20, adapted to screw into the casing, and this plug prevents dust from getting into the valve. The screw is preferably encircled by a washer 21, of rubber or other flexible material, so as to make an air-tight closure. The casing 10 is held in the sleeve 22, which should be of rubber, and to enable the two parts to be securely held together the casing has an external flange 23 which is embedded in the sleeve. The sleeve has at its inner end a washer 24 which is adapted to be cemented to the inner side of the tire 25, and it will be understood that the sleeve and valve may be fastened to either a single or double tube tire.

In securing the sleeve and valve in place the sleeve is introduced into the tire and pushed out through a hole therein, as shown in Fig. 1. The outer end of the sleeve 22 is covered by a cap 26 which gives to the valve a better appearance and also guards the sleeve, and a wear-plate or washer 27 is arranged between the outer end of the sleeve and the end of the cap.

When the tire is to be inflated the plug is removed, an ordinary air-pump is connected with the chamber 12, and when the pump is worked the air forces the valve in the chamber 13 from its seat and passes into the tire, as described, and when the pump is removed the back-pressure closes the valve.

If the tire is to be deflated the plug is removed and the valve pushed from its seat, and to enable this to be easily done a key 28 may be conveniently used.

Having thus described my invention, I claim as new and desire to secure by Letters Patent—

1. An air valve, comprising a casing having a suitable controlling valve therein, and an external flange thereon, a flexible sleeve in which the said casing is held, the sleeve having a washer at its inner end adapted for attachment to a tire, and a cap covering the outer portion of the flexible sleeve, substantially as described.

2. An air valve, comprising a casing having a suitable controlling valve therein, a flexible sleeve encircling the casing and extending to within a short distance of the outer end thereof, the said sleeve being adapted for attachment to a tire, means for closing the outer end of the valve casing, and a cap covering the outer portion of the flexible sleeve, substantially as described.

3. An air valve, comprising a casing having outer and inner chambers connected by an air passage, a screw plug to close the outer chamber, a valve held in the inner chamber and adapted to seat itself over the air passage, a flexible sleeve secured to the casing and having a washer at its inner end adapted for attachment to a tire, the inner end of the said casing projecting beyond the inner end of the flexible sleeve provided with side ports, and a cap covering the outer portion of the flexible sleeve, and a washer arranged between the outer end of the sleeve and the cap substantially as described.

FRANK GUSTAVESON.

Witnesses:
MALCOLM KENNEDY,
C. C. HIRSCHY.